June 26, 1951 G. W. EDWARDS 2,558,128
MANUFACTURE OF CHOCOLATE
Filed June 24, 1947 2 Sheets-Sheet 1
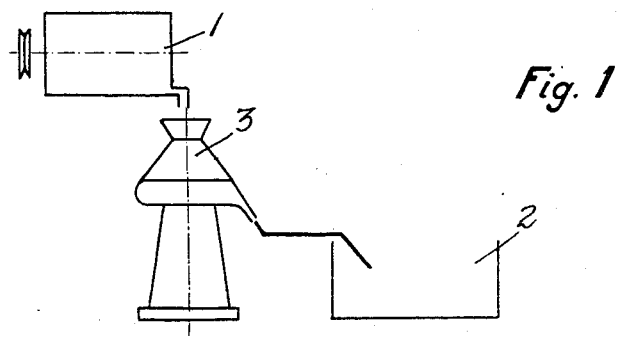
Fig. 1
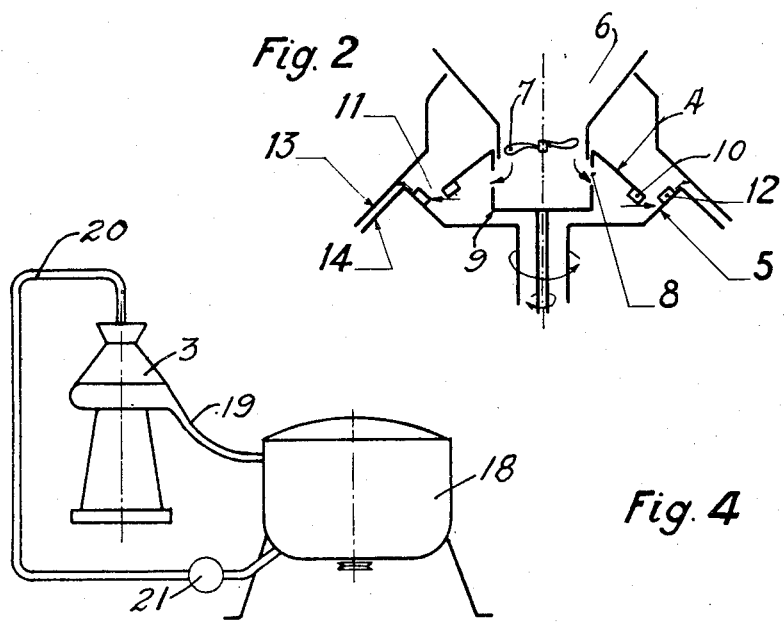
Fig. 2
Fig. 4
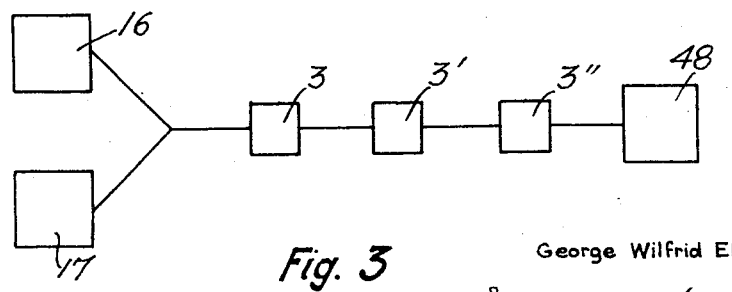
Fig. 3
George Wilfrid EDWARDS
By Jewett & Mead
ATTORNEYS

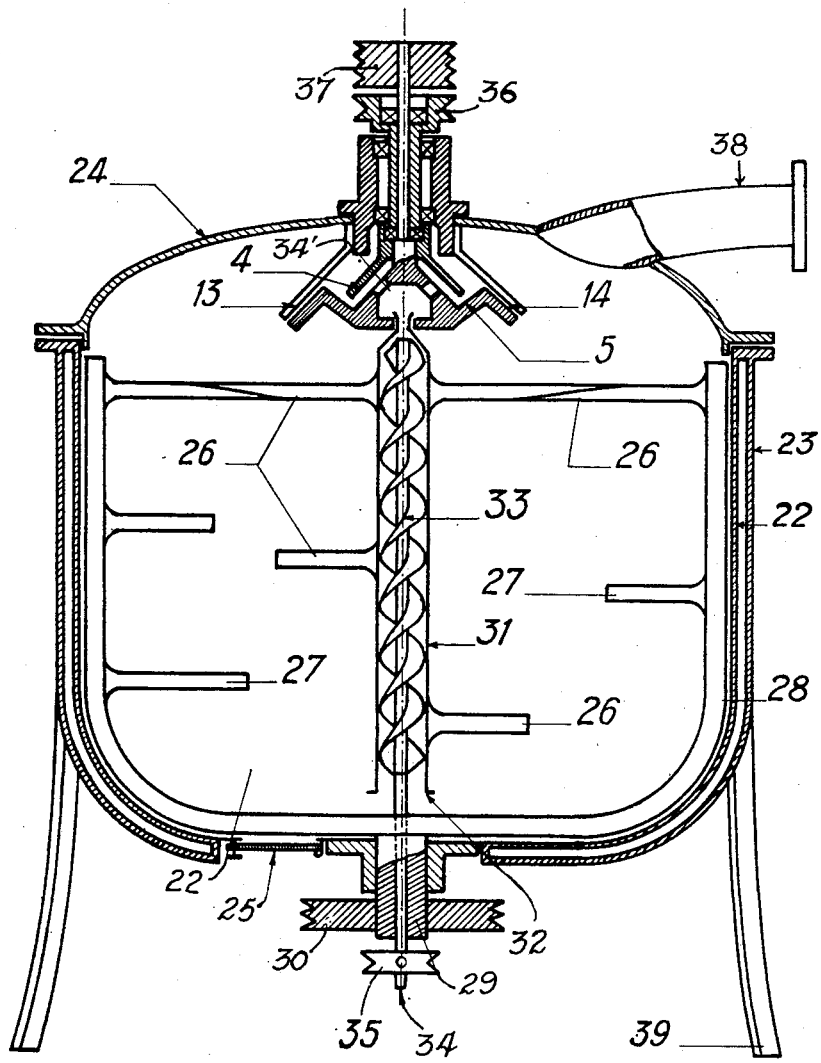

UNITED STATES PATENT OFFICE 2,558,128

MANUFACTURE OF CHOCOLATE

George Wilfrid Edwards, Mitry le Neuf, France

Application June 24, 1947, Serial No. 756,765
In France June 26, 1946

8 Claims. (Cl. 99—23)

The present invention has for its object improvements in the method and plants adapted to produce chocolate and more particularly chocolate of the so-called liquid paste type ranging between ordinary crisp eating chocolate and extra-fondant chocolate. It has for its object to allow primarily executing plants for the production of chocolate, that are much less costly and much less bulky than those erected heretofore.

It has also for its object to provide considerable economy in time, labour and energy, whether electrical or otherwise as required for the finishing of the chocolate.

It has also for its object to allow the production of chocolate of a grade that is substantially better than that obtained heretofore.

Up to now, the production of liquid paste chocolate was executed as follows. After torrefaction of the cocoa nibs and crushing thereof, a so-called cocoa liquor was obtained which was submitted to the following operations and in the first place to the so-called primary mixing operation, that is the mixing in suitable proportions of sugar with cocoa liquor and if required cocoa butter. This primary mixture is then crushed and according to the various systems of manufacture treated either in a vat in vacuo or in mixers in order to prepare the following operation termed in French "conchage." Said operation consists in stirring the paste in large mixing vats (conches) for a duration ranging generally between 8 and 72 hours. These treatments inside the vat submitted to vacuum and in the conches had for their object particularly to provide for a good homogeneization of the paste with a removal of the evil odors. After these operations the paste was dried during a time that could reach 24 hours or even more before it could be moulded.

These different operations required, in the case of the treatment of large amounts of chocolate, considerable plants and a numerous handicraft for handling the paste.

My invention allows in particular doing away altogether or at least partly with the conchage treatment and provides if required for the production of chocolate if not in a continuous manner at least in a single operation between the primary mixture and the moulding. To this purpose, said invention consists in submitting the paste, after the crushing of the primary mixture, to successive repeated drawing, dispersing and shock effects followed if required by a rolling operation after same, these different treatments giving the paste a more complete homogeneization corresponding particularly to a substantial improvement of the mellowness and flavour of the chocolate with reference to chocolate obtained through conchage.

These drawing, dispersing, shock and rolling effects are obtained in particular by submitting the paste immediately after the crushing of the primary mixture to the action of a suitable centrifugal homogenizer such as that disclosed in particular in applicant's Patent Number 2,516,455, issued July 25, 1950, which homogenizer provides in the desired manner the desired drawing, dispersion, shock and rolling effects mentioned hereinabove.

In addition to the mechanical effects moreover, the paste is submitted during its treatment to a vaporization of the undesired substances that should be eliminated by reason of their evil odour and flavour they give to the chocolate, said vaporization being furthered through the considerable dispersion obtained in air or in vacuo. In addition thereto, the homogeneization has for its action to provide a better distribution of the different constituting elements of the paste with reference to one another, whereby the chocolate may be submitted rapidly to the desired transformation and ageing treatments that could not be executed heretofore except after a sufficiently long passage through the conches. Lastly the rolling without producing a true crushing of the different components and in particular of the sugar grains produces in practice a rounding of such grains which gives the chocolate a mellownes which is particularly apparent in the manufactured final cholocate even in the case where the crushed sugar used for the manufacture was not originally provided in extremely fine particles.

When it is desired to adapt the method according to my invention to an existing plant including apparatuses operating in vacuo and conches, it is possible in accordance with my invention to insert an apparatus of the above disclosed type between the apparatus operating in vacuo and the conches in order to treat the paste fed by the apparatus operating in vacuo, which allows reducing to a considerable extent the duration of the conchage treatment itself.

It is also possible in accordance with my invention to arrange in series a plurality of centrifugal homogenizers through which the paste flows in succession, in which case it is possible to omit completely the conchage treatment and even the kiln treatment. The paste passing out of the last homogenizing apparatus may be either sent directly into the moulding apparatus or else after crushing into a crusher of ordinary type provided with blades, grindwheels, rollers or the like, for instance, which operation has for its action in particular to remove any trace of aeration in the paste.

It is not even necessary if required to make the paste pass first through special vacuum apparatuses and the paste produced directly by the preliminary mixing crusher engages the succession of homogenizing means and enters finally a simple mixer from which it is led directly to the moulding means. It will be readily ascertained that these different operations may be performed in a continuous manner as the homogenizers considered cooperate in a continuous manner and consequently it is possible to save considerable time for the different operations and to do away at the same time with the major part of the handicraft required heretofore.

When it is desired to reduce the bulk of the apparatuses, it is also possible, in conformity with the invention to use a single mixer for treating on one hand the paste before its passage through the homogenizers and on the other hand the paste passing out of the last homogenizer.

It is also possible in accordance with my invention to use instead of a series of homogenizers, a single homogenizer inside which the paste undergoing treatment is caused to circulate several times.

It is also possible according to the invention to associate to this purpose in a single machine a mixing apparatus with a homogenizing apparatus, the system being if required submitted to vacuum and the paste undergoing, inside said apparatus, different operations: initial mixture before crushing, homogenizing, removal of all traces of moisture and evil odours and final mixture.

Further features of the invention will appear in the following description corresponding to accompanying drawings showing diagrammatically and by way of example and by no means in a binding sense various forms of execution of the invention. In said drawings:

Fig. 1 is a diagram showing the adaptation of a homogenizing apparatus to the cycle of operation of chocolate of the usual type.

Fig. 2 is a cross-sectional view giving out by way of example, a type of homogenizer that may be used according to the invention.

Fig. 3 is a diagram showing the principle of the invention as applicable to the continuous or substantially continuous production of chocolate by means of several homogenizing apparatuses arranged in series.

Fig. 4 is a cross-sectional view of an arrangement for the production of chocolate wherein the paste passes several times through the same homogenizing device.

Lastly Fig. 5 is a cross-section of a compound mixing and homogenizing apparatus adapted to operate in vacuo and ensuring alone all the operations required for the production of chocolate between crushing and moulding.

Returning to Fig. 1, 1 designates the vacuum apparatus inside which there is introduced for usual operation the paste obtained through the crushing of the primary mixture, while 2 designates the conche and 3 a homogenizing apparatus inserted according to the invention between the vacuum apparatus and the conche.

This homogenizing apparatus may according to the invention be of the type described in applicant's abovementioned patent and illustrated diagrammatically in Fig. 2. Said apparatus includes two rotary cones 4 and 5 or a greater number of such cones rotating for instance in opposite directions at equal speeds. The paste introduced through 6 and carried along by a worm 7 is ejected through the opening 8 of the cylinder 9 and slides over the inner surface of the cone 4 which drives it into rotation through the fins 10. Under the action of centrifugal force the paste flows and is drawn into the shape of a thin layer over the cone 5 and is projected on to a stationary conical surface 13.

During all these operations, the paste is submitted to a considerable dispersion and is transformed finally into an extremely homogeneous mixture.

At the outlet from the cone 5 and when it impinges against the surface 13, said paste flows between said surface 13 and a rotary surface 14 rigid with the cone 5 and it is submitted between said surfaces 13 and 14 to a crushing and a re-agglomeration before it is finally exhausted through a channel that is not illustrated in Fig. 2.

The insertion of the apparatus 3 between the vacuum apparatus 1 and the conche 2 has for its result to give a greater homogeneity to the paste whereby the conchage in the conche 2 may require an extremely reduced time as disclosed hereinabove.

In the form of execution of Figs. 3 to 5, the pulverulent material passing out of the crushers is introduced with the further addition of cocoa butter provided for the different grades of chocolate in the preliminary amalgamating mixers 16 and 17 feeding alternatingly the first of the three homogenizing apparatuses 3, 3', 3'' arranged in series and through which the paste passes in succession while said paste is transferred from one apparatus to the next through a worm conveyor for instance or the like means.

These homogenizing apparatuses may in particular be of the same type as those described with reference to Fig. 1. In such homogenizing apparatuses and as a consequence of the atomizing of the plaste there is provided an intense evaporation which leads to the disappearance of the evil smell and moisture which allows doing away with the vacuum apparatus and with the kilns. At the output from the homogenizing means 3'', the paste is introduced into a terminal mixer 48 that may be a simple mixer of the usual type and the paste passing out of it may be delivered directly to the moulding means if required after the usual so-called tempering operation.

This arrangement in series of the homogenizers allows a substantially continuous production of chocolate, the preliminary mixers 16 and 17 being made use of alternatingly, one of them being filled while the other is operating.

In the form of execution illustrated in Fig. 4, the plant used for production is restricted to a single mixer 18 of the usual type that is adapted to be set under vacuum and to be inserted inside the closed circuit comprising a homogenizing apparatus 3, the pipes 19 and 20 and a pump 21 of any type. The operation of this last arrangement is as follows:

There is first introduced into the mixer 18 the complementary amount of cocoa butter after said mixer has been heated so as to bring its temperature to about 50° C. so as to melt the cocoa butter. There is then introduced gradually into the mixer the primary mixture obtained after crushing.

These different components are then mixed during a certain time inside the mixer 18 so as to obtain a first mixture after which the mixer is stopped if desired or allowed to continue rotating and set under the action of vacuum and if required heated so as to assume a temperature suitable for the treatment of the chocolate, say 80 to 90° C., after which the mixture is caused to circulate through the pump 21 into the homogenizing apparatus 3 and finally to return through the pipe 19 into the mixer. This operation lasts for instance until the mixture has passed as a whole at least three other times through the homogenizer 3. The pump is then stopped and the mixer 18 is started during a few minutes so as to stir again the whole mass undergoing treatment. The mass is then in a state allowing it to be moulded.

It is also possible to provide for the simultaneous operation of the mixer and of the homogenizer by starting said mixer before the stopping of the homogenizer which in certain cases provides a saving of time.

The apparatus illustrated in Fig. 5 allows executing in a particularly simple manner the system of operations that has been described with reference to Fig. 4.

This apparatus includes a vat with a double wall at 22, 23 inside which it is possible to circulate either steam under pressure or cold water so as to keep the vat at a temperature approximating 100° C. or to cool it as the case may be. This vat includes a removable cover 24 and at its lower part an exhaust pipe 25.

It includes moreover if required inspection gates, means for sampling, means for automatic adjustment of temperature etc., and all other members such as auxiliaries for inspection adjustment and safety that have not been illustrated so as to provide a clearer drawing.

Inside said vat is arranged a mixing apparatus including for instance removable blades 26—27 the latter of which are carried by a casing 28 adapted to be urged into rotation by a spindle 29 driven in its turn through the agency of pulleys 30 for instance or through any suitable motor not illustrated.

The inner blades 26 are secured to a hollow tube 31 forming an extension of the part 29 and opening at its lower end 32 a little above the bottom of the vat 22. Inside said tube 32 is located a driving worm 33 controlled through a spindle 34 coaxial with the axis of the blade system and controlled through the pulley 35.

The tube 31 opens at its upper end inside the chamber 34' of the homogenizer which latter is carried by the cover 24 of the vat. The homogenizer is constituted in a manner quite similar to that described with reference to Fig. 1 except for the fact that it is driven from above as apparent from Fig. 5, instead of being driven from below, through the pulleys 36 and 37 for instance. It should be mentioned moreover that the speed of rotation of the homogenizer should be much more considerable than that of the blades of the mixer and that the driving means for the two apparatuses should be executed so as to take this fact into account.

The cover may be connected moreover with a pipe 38 leading to a vacuum pump not illustrated. Furthermore, 39 designates the carrier feet for the system considered as a whole. The apparatus operates in the following manner:

As in the preceding case, the cocoa butter incorporated by way of addition is first mixed with the already crushed primary mixture while the vat 22—23 is suitably heated through steam or hot water for instance. The cover 24 is then closed and the pipe 38 connected with vacuum.

The homogenizer is then actuated together with the driving worm 33 the rotary speed of which should be to that purpose different from that of the tube 31 supporting the blades 26. It may be of interest during said operation to keep the blades 26 of the mixer rotating so as to further the circulation of the paste. The driving worm 33 feeds the homogenizer through the chamber 34' and introduces into it the portion of the mixture lying at the bottom of the vat.

The homogenizing of the paste is continued during a suitable period in a manner such for instance that the whole of the paste may pass at least 3 or 4 times through the homogenizing apparatus. When this operation is at an end, the homogenizer is stopped and the worm 33 is stopped simultaneously and if required after removal of the cover 24 the blades 26 are started rotating during the time required for stirring again the mixture as a whole. It is sufficient to open the cover 24; the mixture is then ready to be sent to the moulding means.

Experience shows that the chocolate obtained in conformity with the invention is of a grade that is superior to that obtained through the usual method. This chocolate devoid of any evil smell and of any trace of moisture and rugosity has a flavor and a mellowness that are far superior while it may be kept for a practically indefinite period of time. Granulometric analysis shows a maximum fineness of 20 to 50 microns which is generally far superior to the results obtained up to the present day.

It is possible of course to bring numerous modifications to the arrangement without unduly widening the scope of my invention which is not limited to the use of centrifugal homogenizers of the type described as it is possible to use any other homogenizer capable of providing similar results.

What I claim is:

1. A method for treating chocolate paste, for the purpose of being substituted, at least partially, for the conching operation, comprising centrifugally spreading the paste in a thin exposed layer, atomizing said paste, and spreading it again in a thin layer.

2. A method for treating chocolate paste, for the purpose of being substituted, at least partially, for the conching operation, comprising centrifugally spreading the paste in a thin exposed layer, atomizing said paste, spreading it again in a thin layer and laminating said paste between two surfaces.

3. A method for treating chocolate paste, for the purpose of being substituted, at least partially, for the conching operation comprising centrifugally spreading the paste in a thin exposed layer, atomizing said paste, spreading it again in a thin layer, laminating said paste between two surfaces and repeating said treatment several times.

4. A method for treating chocolate paste, for the purpose of being substituted, at least partially, for the conching operation, comprising centrifugally spreading the paste in a thin exposed layer under atmospherical conditions, atomizing said paste, and spreading it again in a thin layer.

5. A method for treating chocolate paste, for the purpose of being substituted, at least partially, for the conching operation, comprising centrifugally spreading the paste in a thin exposed layer in vacuum conditions, atomizing said paste, and spreading it again in a thin layer.

6. A method for producing chocolate which comprises crushing the primary cocoa and sugar mixture, incorporating thereto a further amount of cocoa butter, stirring the paste thus obtained, centrifugally spreading the paste in a thin exposed layer, atomizing said paste, spreading it again in a thin exposed layer, laminating said paste between two surfaces, and moulding it.

7. A method for producing chocolate which comprises crushing the primary cocoa and sugar mixture, incorporating thereto a further amount of cocoa butter, stirring the paste thus obtained, centrifugally spreading the paste in a thin exposed layer, atomizing said paste, spreading it again in a thin exposed layer, laminating said paste between two surfaces, stirring the paste, and moulding it.

8. A method for producing chocolate which comprises crushing the primary cocoa and sugar mixture, incorporating thereto a further amount of cocoa butter, stirring the paste thus obtained, centrifugally spreading the paste in a thin exposed layer, atomizing said paste, spreading it again in a thin exposed layer, laminating said paste between two surfaces, repeating said spreading, atomizing and laminating treatment, stirring the paste, and moulding it.

GEORGE WILFRID EDWARDS.

REFERENCES CITED

The following references are of record in the file of this patent:

UNITED STATES PATENTS

| Number | Name | Date |
|---|---|---|
| 2,004,009 | Moir | June 4, 1935 |
| 2,070,558 | Beck | Feb. 16, 1937 |
| 2,348,473 | Hollstein | May 9, 1944 |
| 2,367,149 | Smith | Jan. 9, 1945 |

FOREIGN PATENTS

| Number | Country | Date |
|---|---|---|
| 461,772 | Great Britain | Feb. 24, 1937 |